United States Patent
Anderson et al.

(10) Patent No.: US 6,724,972 B2
(45) Date of Patent: Apr. 20, 2004

(54) SILICATE WAVEGUIDE COMPOSITIONS FOR EXTENDED L-BAND AND S-BAND AMPLIFICATION

(75) Inventors: Mark T. Anderson, Woodbury, MN (US); Craig R. Schardt, Saint Paul, MN (US); James R. Onstott, Dresser, WI (US); Kenton D. Budd, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 53 days.

(21) Appl. No.: 10/038,370

(22) Filed: Dec. 31, 2001

(65) Prior Publication Data

US 2003/0156818 A1 Aug. 21, 2003

(51) Int. Cl.[7] .................................................. G02B 6/00
(52) U.S. Cl. ..................... 385/142; 385/141; 359/341.5
(58) Field of Search .............................. 385/141, 142, 385/123, 129, 130, 131, 132, 126, 127; 359/341.5

(56) References Cited

U.S. PATENT DOCUMENTS

| | | | |
|---|---|---|---|
| 3,646,473 A | * | 2/1972 | Young .......................... 372/40 |
| 5,206,925 A | * | 4/1993 | Nakazawa et al. ........... 385/142 |
| 5,572,356 A | * | 11/1996 | Yoshida et al. ......... 359/341.31 |
| 5,778,129 A | * | 7/1998 | Shukunami et al. ........ 385/127 |
| 5,930,414 A | | 7/1999 | Fishman et al. |
| 5,982,963 A | | 11/1999 | Feng et al. |
| 6,128,430 A | | 10/2000 | Chu et al. |
| 6,271,952 B1 | | 8/2001 | Epworth |
| 2002/0021882 A1 | | 2/2002 | Wyatt et al. |

FOREIGN PATENT DOCUMENTS

| | | |
|---|---|---|
| DE | 199 03 523 A1 | 8/2000 |
| EP | 0 964 237 A1 | 12/1999 |
| EP | 0 982 882 A2 | 3/2000 |
| JP | 07231291 | 8/1995 |
| KR | 2000-0027961 | 5/2000 |
| SU | 1273339 A1 | 11/1986 |
| WO | WO 00/55101 | 9/2000 |
| WO | Wo 01/27667 A2 | 4/2001 |

OTHER PUBLICATIONS

A. Mori, et al; "1.5 μm Broadband Amplification by Tellurite–Based EDFAs"; *Conference on Optical Fiber Communications, Technical Digest, Postconference Ed.* OSA Technical Digest Series vol. 6; 1997; pp. 371–374; Optical Society of America.

R.L. Shubochkin, et al; "$Er^{3+}$—$Tm^{3+}$Co–doped Silica Fiber Laser"; *OSA TOPS*, vol. 26 Advanced Solid–State Lasers; 1999; pp. 167–171; Optical Society of America.

H. Jeong & K. Oh; "Characterization of Amplified Spontaneous Emission Light Source from an $Er^{3+}/Tm^{3+}$Co–doped Silica Fiber"; *Conference on Lasers and Electro–Optics, Technical Digest, Postconference Ed.* TOPS vol. 39; 2000; pp. 544–545; Optical Society of America.

(List continued on next page.)

Primary Examiner—Robert H. Kim
Assistant Examiner—Michael H Caley
(74) Attorney, Agent, or Firm—Gregg H. Rosenblatt; Alan Ball

(57) ABSTRACT

An optical waveguide including a core having silica, Al, a non-fluorescent rare-earth ion, Ge, Er, and Tm. The non-fluorescent rare-earth ion may be La. Exemplary compositions concentrations are Er is from 15 ppm to 3000 ppm, Al is from 0.5 mol % to 12 mol %, La is less than or equal to 2 mol %, Tm is from 15 ppm to 10,000 ppm; and the Ge is less than or equal to 15 mol %. The core may further include F. An exemplary concentration of F is less than or equal to 6 anion mol %.

52 Claims, 8 Drawing Sheets

OTHER PUBLICATIONS

"Lucent Technologies announces two new erbium–doped fibers for the extended L–band the C–band"; Lucent Technologies [online]; [available on the internet Oct. 1, 2001]; [retrieved from the internet Jan. 23, 2003].

D. Sobiski, et al., "*Fast First–Order PMD Compensation with Low Insertion Loss for 10Gbit/s System*", Electronics Letters, Jan. 4, 2001, vol. 37, No. 1, pp. 46–48.

H. Rosenfeldt, et al., "*PMD Compensation in 10Gbit/s NRZ Field Experiment Using Polarimetric Error Signal*", Electronics Letters, Mar. 2, 2000, vol. 36, No. 5, pp. 448–450.

Reinhold Noé, et al., "*Polarization Mode Dispersion Compensation at 10, 20, and 40 Gb/s with Various Optical Equalizers*", Journal of Lightwave Technology, vol. 17, No. 9, Sep. 1999, pp. 1602–1616.

D. A. Watley, et al., "*Compensation of Polarisation–Mode Dispersion Exceeding One Bit Period Using Single High–Birefringence Fibre*", Electronics Letters, Jun. 24, 1999, vol. 35, No. 13, pp. 1094–1095.

Takeshi Ozeki, et al., "*Polarization–Mode–Dispersion Equalization Experiment Using a Variable Equalizing Optical Circuit Controlled by a Pulse–Waveform–Comparison Algorithm*", OFC '94 Technical Digest, Tuesday Afternoon, pp. 62–64.

T. Takahashi, et al., "*Automatic Compensation Technique for Timewise Fluctuating Polarisation Mode Dispersion in In–Line Amplifier Systems*", Electronics Letters, Feb. 17, 1994, vol. 30, No. 4, pp. 348–349.

X. Zou, et al; "Mechanisms of Upconversion Fluorescences in $Er^{3+}$, $Tm^{3+}$Codoped Fluorozircoaluminate Glasses", *Journal of Non–Crystalline Solids* (Feb. 1995); North–Holland Physics Publishing, Amsterdam, NL; vol. 181, No. 1–2; pp. 100–109.

* cited by examiner

SILICATE WAVEGUIDE COMPOSITIONS FOR EXTENDED L-BAND AND S-BAND AMPLIFICATION

RELATED APPLICATIONS

The present case is related to co-pending, commonly owned, concurrently filed U.S. Applications entitled "Improved Emission Silicate Waveguide Compositions For Extended L-Band and S-band Amplification" and "Germanium Free Silicate Waveguide Compositions For Extended L-Band and S-Band Amplification", both of which are hereby incorporated by reference.

BACKGROUND OF THE INVENTION

The present invention relates to an optical waveguide suitable for optical amplification at wavelengths in the extended L- and S-bands. In particular, the present invention relates to waveguides having a chemical composition that provides for longer excited-state lifetime and enhanced infrared emission.

High-speed optical telecommunications via optical networks allow for the transfer of extremely large amounts of information through optical signals. As these optical signals travel over long distances or are coupled, manipulated, or directed by optical devices, the signals lose their strength. Signal attenuation may be caused by a number of factors, such as the intrinsic absorption and scattering in the transmission fiber, coupling losses, and bending losses. As a signal becomes weaker, it becomes more difficult to detect and propagate the signal. Eventually, a signal may become so weak that the information is lost.

Optical amplification is a technology that intensifies an optical signal. Optical amplification is a vital part of present-day high-speed optical communications.

Optical amplification is typically performed using devices (amplifiers) that contain a pump laser, a wavelength division multiplexer, isolators, gain shaping gratings, and an active rare-earth-doped optical fiber. The typical wavelength range at which present day optical networks—and optical amplifiers—operate is ~1530–1570 nm, the so-called C-band. A band may be defined as a range of wavelengths, i.e., an operating envelope, within which the optical signals may be handled. A greater number of available bands generally translates into more available communication channels. The more channels, the more information may be transmitted.

Each band is identified with a letter denomination. Band denominations used in the present application are:

| Band | Wavelength Range |
| --- | --- |
| C- | ~1530 to ~1570 nm |
| L- | 1570 to ~1605 nm |
| Extended L | 1570 to ~1630 + nm |
| S | 1450 to 1530 nm |

Currently, high-speed internet-backbone optical fiber networks rely on optical amplifiers to provide signal enhancement about every 40–100 km. State-of-the-art commercial systems rely on dense wavelength division multiplexing (DWDM) to transmit ~80–10 Gbit/second channels within a narrow wavelength band (e.g. C-band). Channels can be spaced ~0.4 nm apart. These channels can be interleaved with forward and backward transmission (0.4 nm between a forward and backward directed channel) to provide multiterabit/second bidirectional transmission rates over a single fiber.

Recently, with the advent of L-band amplifiers, the optical transmission operating range has been extended from 1530–1565 nm to 1530–1605 nm—using both C- and L-band amplifiers, which provides up to 160 channels/fiber. There is a significant desire for even broader band operation to increase information throughput. Normally operation is limited to a maximum wavelength of ~1605 nm by excited state absorption in the erbium-doped fiber. Operation is theoretically limited to wavelengths of light shorter than ~1650 nm in silicate-based fibers owing to high attenuation from multiphonon absorption at wavelengths greater than 1650 nm. Currently, operation is practically limited to wavelengths shorter than ~1630 nm in a fiber system owing to macrobending losses.

Future systems will potentially use wavelengths from 1450 to 1630 nm, which includes the so-called S-band. Use of the S-band has been demonstrated to nearly double the information carrying capacity of existing two stage C-+L-band systems. Transmissions of up to ~10.5 Tb/s over a single fiber using a C-+L-+S-band configuration have been shown in a laboratory demonstration.

There are generally three approaches to optical amplification in the 1450–1630 nm region; Raman amplification, amplification with rare-earth-doped fiber amplifiers, and amplification that combines Raman and rare-earth-doped components.

Raman Fiber Amplifiers

Raman amplifiers rely on the combination of input photons with lattice vibration (phonons) to shift the pump light to longer wavelengths (Stokes shift). Amplification spectra are broad, but sometimes have unwanted sharp peaks. The process is inefficient, and requires a high power pump source. Such high power pumps include fiber lasers or a series of laser diodes, which can be quite costly. The process is nonlinear with incident intensity. Because it requires high input intensities, the process may lead to other unwanted nonlinear processes such as 4-wave mixing and self phase modulation. Nonetheless, Raman amplifiers are useful in combination with rare-earth-doped amplifiers to increase span lengths, especially for 10 Gbit/s and faster systems operating in the C- and L-bands.

Rare-Earth-Doped Fiber Amplifiers

Rare-earth doped amplifiers rely on excitation of electrons in rare-earth ions by an optical pump and subsequent emission of light as the excited ions relax back to a lower energy state. Excited electrons can relax by two processes: spontaneous emission and stimulated emission. The former leads to unwanted noise and the latter provides amplification. Critical parameters for an amplifier are its spectral breadth, noise figure, and power conversion efficiency (PCE). The latter two parameters correlate with excited state lifetime of the rare-earth ions: longer lifetimes lead to lower noise and higher PCEs. Spectral breadth in the fiber in the C-band, which determines how many channels can be simultaneously amplified in the C-band, correlates with the full-width-half-maximum (FWHM) of the spontaneous emission spectrum of the rare-earth-doped glass.

The majority of commercial amplifiers are based on fibers in which the core glass comprises erbium-doped silicates that contain either aluminum and lanthanum (SALE—(silicon, aluminum, lanthanum, erbium)) or aluminum and germanium (SAGE). Of the two traditional fiber types, SAGE provides slightly greater spectral width, which allows for additional channels. SALE fiber generally provides slightly higher solubility of rare earth ions, which enables shorter fibers to be used. This is advantageous to minimize, for example, polarization mode dispersion. SALE and SAGE fibers typically provide amplification in the C- or L-bands, but this leaves a large portion of the low-loss region of the silica transmission fiber unused, namely the S-band and long wavelength portion of the extended L-band region (>1610 nm).

In the S-band, rare-earth doped fiber amplifiers typically rely on non-silicate thulium (Tm)-doped glasses. Thulium provides a relatively broad emission that is centered at ~1470 nm. The energy levels of thulium are such that multiphonon processes can easily quench this transition, especially in high phonon energy hosts such as silica. For this reason, lower phonon energy glasses such as heavy metal oxides (e.g. germanosilicates) and especially fluoride glasses such as "ZBLAN" are preferred as hosts for the thulium. These non-silicate glasses tend to be difficult to fiberize and splice to existing transmission fiber and to date have limited commercial applications.

In the extended L-band, rare earth doped fibers typically are heavy-metal oxide or fluoride-based. Examples of oxide glasses are those based on tellurium oxide and antimony oxide. Both of these types of glasses are difficult to splice owing to their low melting points and high refractive indices.

In the S- and extended L-band, researchers have worked on an optical amplifier approach using a fiber with a core containing simultaneously erbium and thulium. Unexamined Korean Patent Application; No. 10-1998-00460125 mentions a fiber having a core comprising $SiO_2$, $P_2O_5$, $Al_2O_3$, $GeO_2$, $Er_2O_3$, $Tm_2O_3$ (SPAGET). The Er and Tm ions are in the range of 100–3000 ppm and the core can optionally contain Yb, Ho, Pr, and Tb in addition to Er and Tm. The reference further speaks about a cladding that contains $SiO_2$, F, $P_2O_5$, and $B_2O_3$.

An Er—Tm codoped silica fiber laser has been reported. The laser contained a fiber having a $SiO_2$—$Al_2O_3$—$GeO_2$—$Er_2O_3$—$Tm_2O_3$ core (SAGET) and was pumped at 945–995 nm to obtain emission from Er (~1.55 $\mu$m), Tm (~1.85–1.96 $\mu$m) or both depending upon the parameters of mirrors in the laser cavity, fiber length, pump rate, and pump wavelength. Two fibers were reported. In the first fiber the Er/Tm concentrations were 6000/600 ppm. In the second the concentrations were 1200/6000 ppm. The numerical apertures (NAs) were ~0.27 and ~0.12, respectively. The second mode cutoff was ~1.4 $\mu$m in both. The first fiber exhibited lasing (gain), but the second did not.

An amplified spontaneous emission (ASE) light source has been reported that contains Er and Tm and which exhibits significant emission enhancement in the S-band region compared to sources that contain erbium only. The reported fiber contained an $SiO_2$—$Al_2O_3$—$GeO_2$—$Er_2O_3$—$Tm_2O_3$ core (SAGET) and contained two levels of Er/Tm. In the first fiber the Er/Tm concentrations were 1200/6000 ppm. In the second the concentrations were 300/600 ppm. The NAs of the fibers were 0.2 and 0.22 respectively. In both cases an ~90 nm FWHM forward ASE peak was observed from ~1460–1550 nm. The second fiber had an ASE about 5 dB higher than the first.

Finally, L-band amplifier modules have been reported that contain two separate fiber types, one doped only with erbium and one doped only with thulium-doped. The fibers are coupled together. The thulium-doped fiber absorbs a portion of the light emitted from the erbium-doped fiber and modifies the gain slope.

Given the ever increasing demand for broadband services, it is highly desirable to have a single amplifier, compatible with silicate transmission fiber, that has significant gain at wavelengths between 1570 and ~1630 nm, i.e., extended L-band. An extended L-band amplifier operating to ~1630 nm would enable greater than 50% more channels compared to a conventional L-band amplifier. Thus, there is a desire for silicate-based fibers that provide substantial emission in the extended L-band. It is also desirable to have an economical, S-band amplifier that is compatible with the current fiber infrastructure. A desirable fiber amplifier would provide longer lifetime and/or increased emission intensity compared to existing amplifiers along the desired bands.

SUMMARY OF THE INVENTION

The present invention is directed to extended L-band amplifiers, and to waveguides and glasses for use in such amplifiers. The present invention further provides desirable S-band emission in a silica-based waveguides and amplifiers.

An optical waveguide according to the present invention comprises a core and a cladding surrounding the core. The cladding comprises a material having a lower refractive index than the core at the operating wavelength of the waveguide. The optical waveguide may be, for example, a laser rod, an optical fiber, or a planar waveguide.

The core comprises silica, Al, a non-fluorescent rare-earth ion, Ge, Er, and Tm. An exemplary non-fluorescent rare-earth ion is La. However, other the non-fluorescent rare-earth ion such as Y, Sc, and Lu also are contemplated.

In exemplary compositions the molar concentrations are: Er from 15 ppm to 3000 ppm, Al from 0.5 mol % to 12 mol %, La less than or equal to 2 mol %, Tm from 15 ppm to 10,000 ppm; and the Ge less than or equal to 15 mol %. The core may further include F. An exemplary concentration of F is less than or equal to 6 anion mol %. In particular embodiments, the concentration of Er is from 150 ppm to 1500 ppm, the concentration of Al is from 4 mol % to 10 mol %, the concentration of Tm is from 150 ppm to 3000 ppm, and/or the concentration of Ge is from 1 mol % to 15 mol %.

In more particular embodiments, the concentration of Al is greater than 1 mol %. The concentration of Al plus Ge plus La may be greater than 5 mol % or 10 mol %. The exemplary concentration of Tm may be greater than 300 ppm or greater than 1000 ppm. In some embodiments, the concentration ratio of Tm/Er is at least 1.

The optical waveguide may have desirable spontaneous emission intensities. Exemplary values are: emission at 1600 nm when pumped at 980 nm of greater than or equal to −8 dB relative to the maximum emission intensity at ~1.53 $\mu$m; emission at 1650 nm when pumped at 980 nm greater than or equal to −14 dB relative to the maximum emission intensity at ~1.53 $\mu$m; emission at 1500 nm when pumped at 980 nm is no less than −10 dB relative to the maximum emission intensity at ~1.53 $\mu$m; emission at 1500 nm when pumped at 800 nm is no less than −8 dB relative to the maximum emission intensity at ~1.53 $\mu$m; and emission at 1500 nm when pumped at 1060 nm is no less than −10 dB relative to the maximum emission intensity at ~1.53 $\mu$m.

The average $Er^{3+4}I_{13/2}$ lifetime of the waveguide may be greater than 1 ms, or preferably greater than 5 ms. The present invention also contemplates optical devices, such as an amplifying device, using the disclosed optical waveguide.

A method of making an erbium-doped optical fiber for use in optical amplifiers according to the present invention comprises the step of providing a substrate tube. High purity silica-based cladding layers are deposited on the inside of the tube. A core glass that comprises silica, Al, a non-fluorescent rare-earth ion, Ge, Er, and Tm is then deposited in the tube. The tube is then collapsed to form a preform. Finally, the preform is drawn to yield optical fiber.

In certain embodiments, the core glass is substantially homogeneous. The core may include at least two regions, wherein one region contains a substantially different Er to Tm ratio than the other region. Said regions may be in an annular arrangement.

The core of such a waveguide may be made with one or more MCVD passes, sol-gel passes or with soot deposition, solution doping, and consolidation passes.

DETAILED DESCRIPTION OF THE INVENTION

Figure 1:
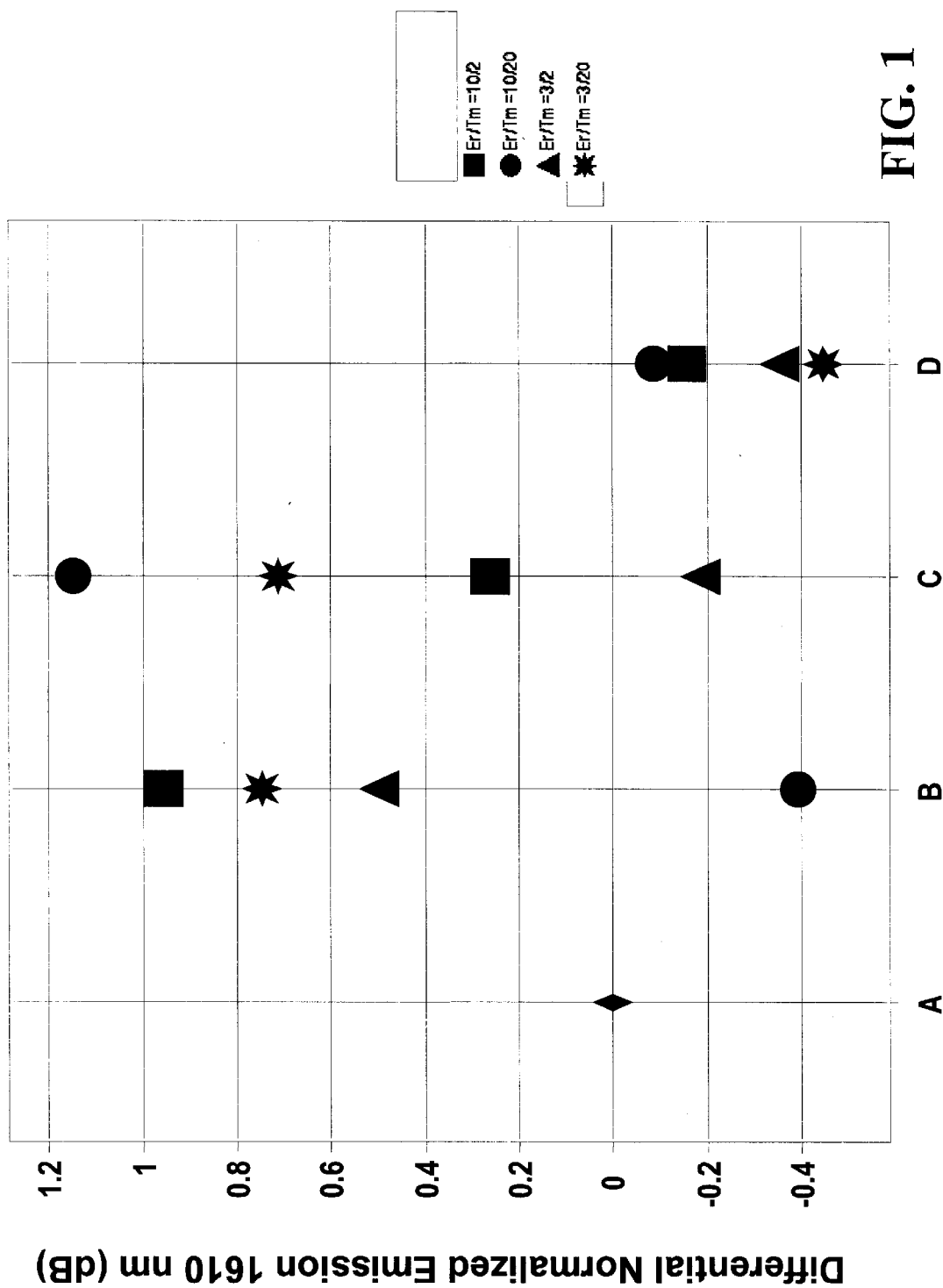
FIG. 1 is a graph of differential normalized spontaneous emission at 1610 nm for three different glass hosts.

The present invention discloses a novel optical waveguide article, waveguide material, and a method for its manufacture. An exemplary optical waveguide according to the present invention comprises a core and a cladding surrounding the core, the cladding comprising a material having a lower refractive index than the core. The core comprises silica, Al, a non-fluorescent rare-earth ion, Ge, Er, and Tm. In one embodiment, the core glass generally is substantially homogeneous.

Exemplary non-fluorescent rare-earth ions are La, Y, Lu, and Sc. One or more of such ions may be added. In a particular embodiment, the core comprises silica, alumina, lanthana, germania, erbium oxide, and thulium oxide and is referenced by the SALGET (Si, Al, La, Ge, Er, and Tm) nomenclature.

The present specification discloses that, unexpectedly, SALGET waveguide glass compositions that contain Er, Tm, and La in combination with Al and Ge dopants in accordance with the present invention have an unusually strong extended L-band emission. In a particular embodiment, such waveguides contain more than 1000 ppm Tm.

One particular embodiment of the present invention contains Si (as $SiO_2$), Al (as $AlO_{1.5}$), La (as $LaO_{1.5}$), Ge (as $GeO_2$), Er (as $ErO_{1.5}$), and Tm (as $TmO_{1.5}$). In yet another particular embodiment fluorine (F) may be added to substitute for some of the oxygen. In particular embodiments:

a) the concentration of Er is from 15 ppm to 3000 ppm;
b) the concentration of Al is from 0.5 mol % to 12 mol %;
c) the concentration of La is less than or equal to 2 mol %;
d) the concentration of Tm is from 15 ppm to 10,000 ppm; and
e) the concentration of Ge is greater than 0 mol % and less than or equal to 15 mol %.

In F-containing embodiments, the concentration of F is less than or equal to 6 anion mol %.

In yet more specific embodiments, the concentration ranges are as follows:

a) the concentration of Er is from 150 ppm to 1500 ppm.
b) the concentration of Al is from 4 mol % to 10 mol %.
c) the concentration of Tm is from 150 ppm to 3000 ppm.
d) the concentration of Ge is from 1 mol % to 15 mol %.

In a first specific embodiment, the concentration of Al is greater than 1 mol %. In a second embodiment, the concentration of Al plus Ge plus La is greater than 5 mol %. In a third embodiment, the concentration of Al plus Ge plus La is greater than 10 mol %. In a fourth embodiment, the concentration of Tm is greater than 150 ppm. In a fifth embodiment, the concentration of Tm is greater than 1000 ppm. In a sixth embodiment, the concentration ratio of Tm/Er is at least 1.

The described compositions may be used in waveguides such as laser rods, optical fibers, and planar waveguides.

FIGS. 1–8 illustrate the behavior of different exemplary embodiments of the present invention. The experimental procedure is described in more detail in the Examples section. Values after labels in the FIGS. 1–4 and throughout the specification are [Er]*150 ppm and [Tm]*150 ppm, on a cation molar basis, respectively (e.g. "10" or "10×" denotes 10*150 ppm or 1500 ppm).

The data for FIGS. 1–4 was obtained using the compositions and procedures outlined in Example 1 below. FIG. 1 is a graph comparing the emission characteristics of different compositions of glass samples. The graph shows differential normalized spontaneous emission at 1610 nm for three different hosts (B-SAGET, C-SALGET, D-SALET) with four Er/Tm ratios as compared to SALE fiber (A). Differential normalized emission, throughout FIGS. 1–3 and 5, is determined by first normalizing the spontaneous emission intensity of each sample to its peak intensity (typically around 1530 nm) and then subtracting the normalized value (in dB) at the specified wavelength for a standard SALE fiber from the normalized value (in dB) at that wavelength for the experimental glass. The y-axis indicates the relative emission on a dB scale. The SALE fiber is standard erbium doped amplifier fiber, such as that available from Minnesota Mining and Manufacturing, St. Paul, Minn.

Figure 2:
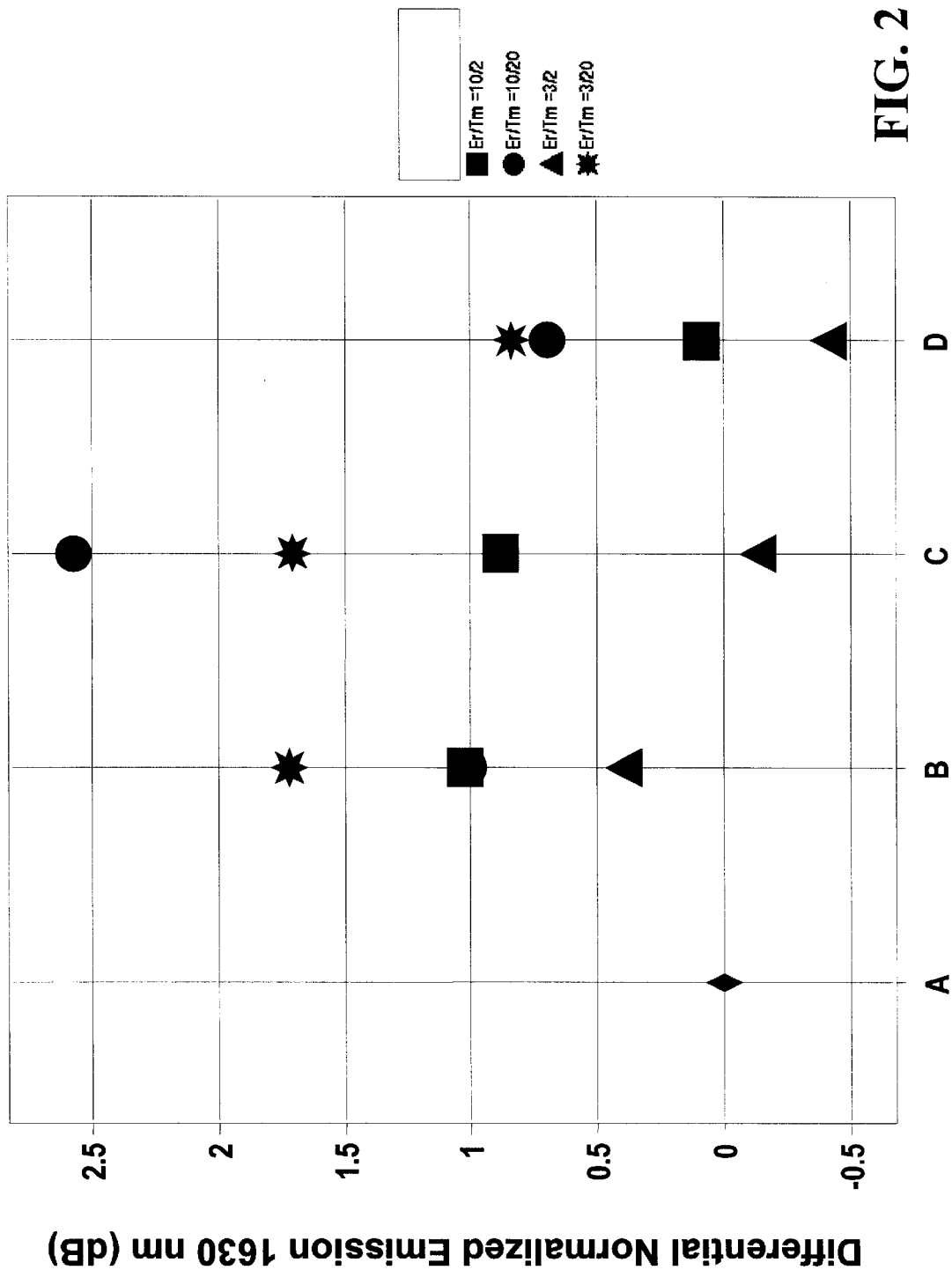
FIG. 2 is a graph of differential normalized spontaneous emission at 1630 nm for three different glass hosts.

FIG. 2 shows differential normalized spontaneous emission at 1630 nm for the same three hosts (B-SAGET, C-SALGET, D-SALET) with four Er/Tm ratios as compared to SALE fiber (A). The figure further shows that it is possible to get enhanced normalized emission at 1630 nm for SALGET, SAGET, and SALET glasses. As stated above, the 1630 nm wavelength is particularly relevant, as fibers are normally constrained to operate at 1630 nm or less owing to macrobending losses.

Figure 3:
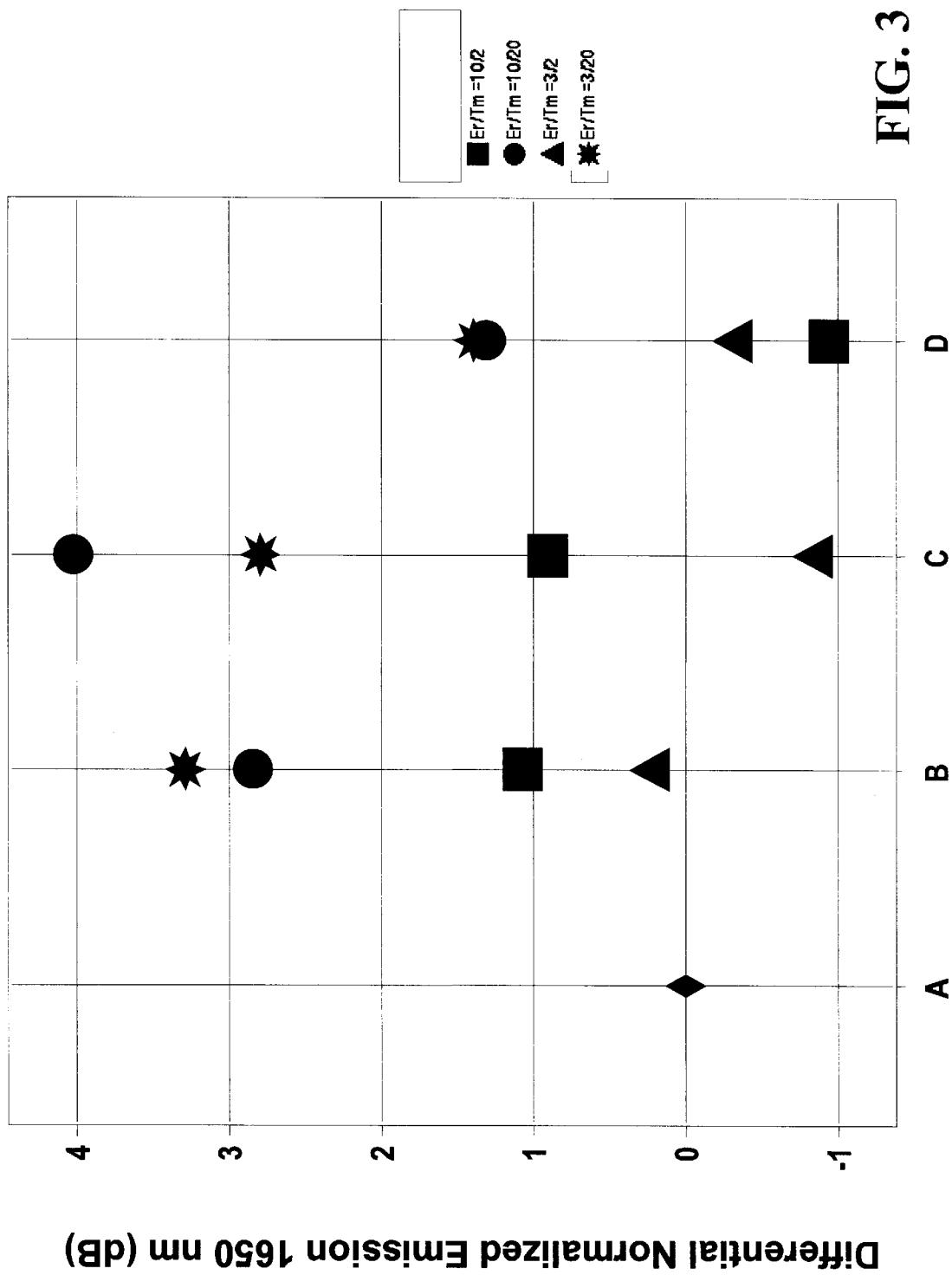
FIG. 3 is a graph of differential normalized spontaneous emission at 1650 nm for three different glass hosts.

FIG. 3 shows differential normalized spontaneous emission at 1650 nm for the same three hosts compared to SALE fiber. The figure shows that it is possible to get enhanced normalized emission at 1650 nm for SALGET, SAGET, and SALET glasses. The figure further shows that it is possible to get significantly increased relative emission intensity, especially for glasses containing high Tm concentrations. The 1650 nm wavelength is important because at 1650 nm multiphonon absorption becomes significant, defining the fundamental limit of operation of a silicate fiber.

FIGS. 1–3 show that differential normalized emission in the 1610–1650 nm region is highly sensitive to the host type, the Er/Tm ratio, and the molar concentration of Tm. SALGET and SAGET hosts with high absolute concentrations of Tm (e.g. 20×) generally provide the most substantial relative emission.

FIGS. 1–3 also show the synergistic effects of La plus Ge on differential normalized emission intensity at wavelengths from 1610 nm to 1650 nm in SALGET glass. For high absolute concentrations of Er and Tm, the emission intensity for SALGET glasses substantially exceeds that of SAGET and SALET glasses. The emission properties are unexpected, and would not be anticipated simply from a linear combination of the behavior of SAGET and SALET. As may be seen in FIG. 4, this emission intensity enhancement is accompanied by a slightly shorter average lifetime for SALGET as compared to SALET and SAGET glasses.

Figure 4:
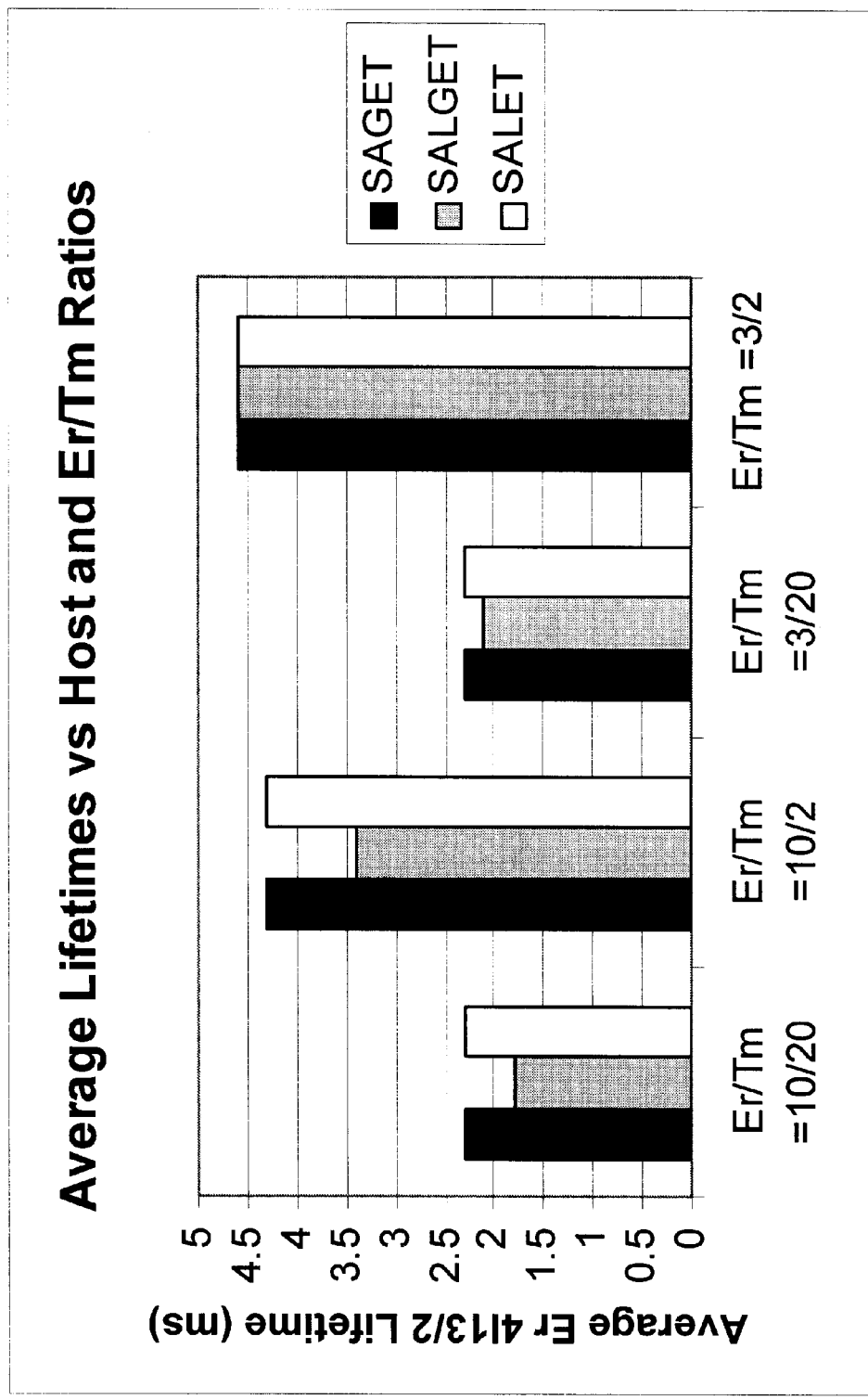
FIG. 4 is a plot of $Er^{3+}\,^4I_{13/2}$ average lifetime versus glass host type.

FIG. 4 is a plot of $Er^{3+}\,^4I_{13/2}$ average lifetime versus glass host type. Data were acquired pulsing a 980 nm light source incident on a bulk glass sample at ~10 Hz and monitoring the decay of the emission intensity. The emission decay curves were fit with a double exponential fit using standard software to determine average lifetime.

FIG. 4 illustrates that average lifetime is dependent on host and Er/Tm ratio. For the exemplified compositions, the average lifetimes for SALET and SAGET are very similar regardless of Er/Tm ratio. The average lifetime for exemplary SALGET compositions is typically less than or equal to that for SALET and SAGET. Note also that the Er lifetime appears to depend strongly on the Tm-concentration. The average $Er^{3+}\,^4I_{13/2}$ lifetime is greater than 1 ms and, in several preferred examples the lifetime is greater than 5 ms.

Figure 5:
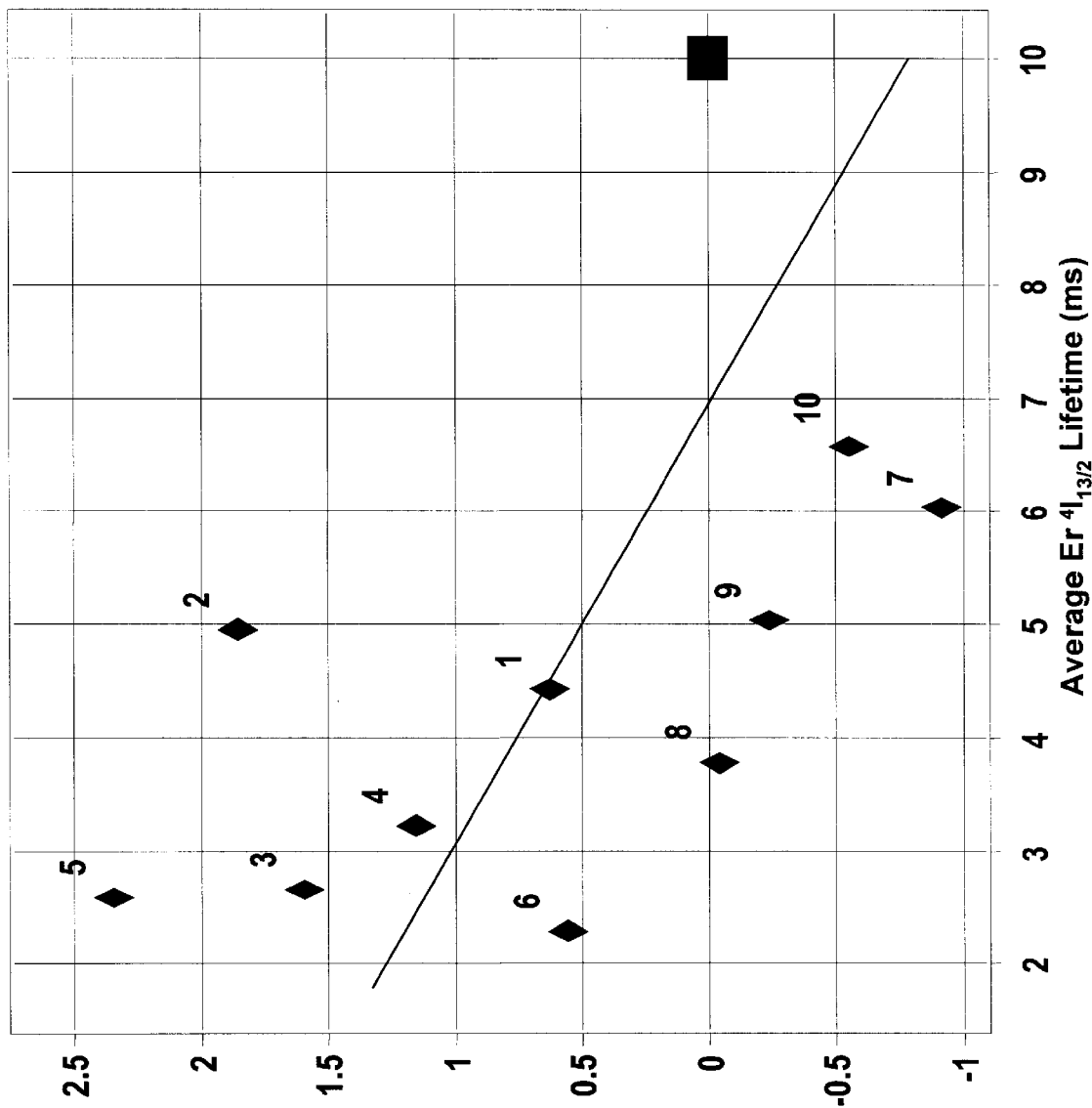
FIG. 5 is a graph of differential normalized spontaneous emission at 1630 nm vs. $Er^{3+}\,^4I_{13/2}$ average lifetime for ten SALGET samples.

FIG. 5 is a graph of differential normalized spontaneous emission at 1630 nm vs. $Er^{3+}\,^4I_{13/2}$ average lifetime for ten SALGET samples. From the exemplary data in FIG. 5 and Example 2 below, one may readily appreciate that [Al] and [Tm] are important factors in determining the optical behavior of SALGET glasses, along with Er—La and Tm—La interactions. The data indicates that increasing the amount of Al decreases the peak emission wavelength; broadens the FWHM of the Er emission peak; increases the normalized emission intensity at wavelengths longer than 1600 nm, especially at wavelengths from ~1600–1620 nm; shifts the Tm 1.6 µm peak to longer wavelength, and decreases the upper state lifetime. Increasing the Tm concentration is shown to increase the normalized emission, especially at wavelengths of 1630+ nm; shifts the Tm 1.6 µm peak to long wavelengths; and decreases the average lifetime.

To form efficient, low noise amplifiers, it is desirable that the erbium lifetime be as long as possible. From Example 2, longer Er lifetimes generally occur for lower concentrations of Tm and Al, but lower concentrations of these elements decrease the normalized emission in the extended L-band. Thus, there is a tradeoff between increased normalized emission and long lifetime.

FIG. 5 also shows that in SALGET the emission/lifetime behavior appears to depend strongly upon the levels of the modifier ions used. By changing the relative amounts of Al, La, and Ge one may be able to achieve a wide range of emission/lifetime scenarios.

Figure 6:
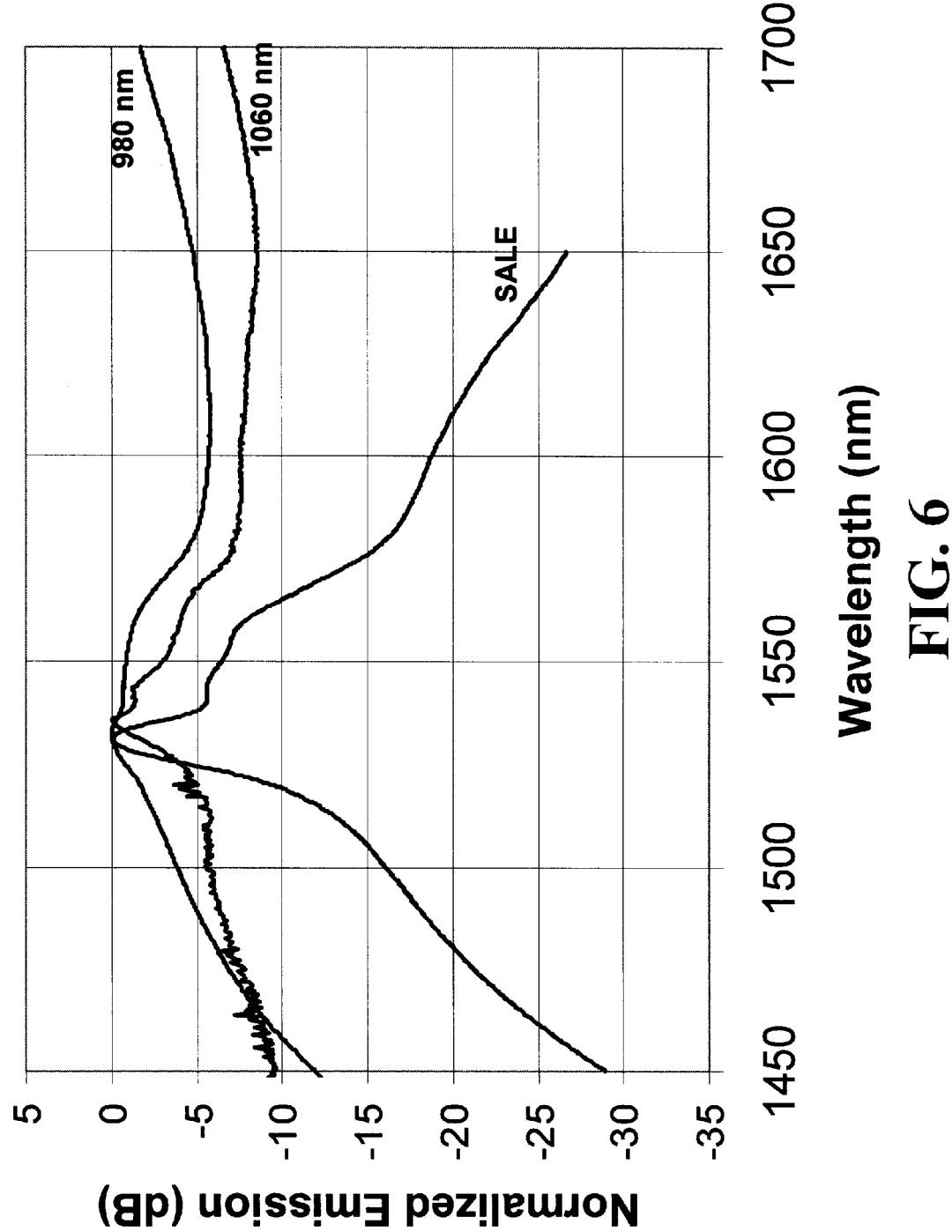
FIG. 6 is a plot of the normalized spontaneous emission for a fiber in accordance with the present invention and for a control fiber.

FIG. 6 is a plot of the normalized spontaneous emission for erbium-thulium (SALGET) "Fiber 1", described in Example 3 below, and for erbium-doped L-band fiber (SALE fiber). The experimental (SALGET) fiber was pumped at 980 and at 1060 nm. Two lengths of fiber were used, 0.25 m and 200 m. The data for the 200 m fiber was relatively indistinguishable from that for the 0.25 m fiber, so the 200 m data is not shown.

Fiber 1 has ~34× Er and 67× Tm. From our experimental data, these concentrations are too high to allow inversion of the erbium population and amplification, owing to the strong absorption of the rare earth ions. The fiber does, however, allow the measurement of a spontaneous emission spectrum, which shows that SALGET glasses have very different emission curve shapes in the extended L-band region and S-band region than standard SALE L-band fiber.

Fiber 1 exhibits much enhanced normalized emission compared to the standard L-band fiber. For instance, the FWHM (−3 dB) is ~9.2 nm for the L-band fiber pumped at 980 nm, whereas it is ~62 nm for fiber 1 pumped at 980 nm. The absolute spontaneous emission intensity of Fiber 1 is nearly two orders of magnitude less than the L-band fiber. At least some of this difference likely can be attributed to the high concentration of absorbing Er and Tm ions in Fiber 1. The wavelength of peak emission is red-shifted in fiber 1 (1531.8 nm vs 1531.2 nm for L-band) for 980 nm pumping. It is red shifted ~3–4 nm for 1060 nm pumping.

Figure 7:
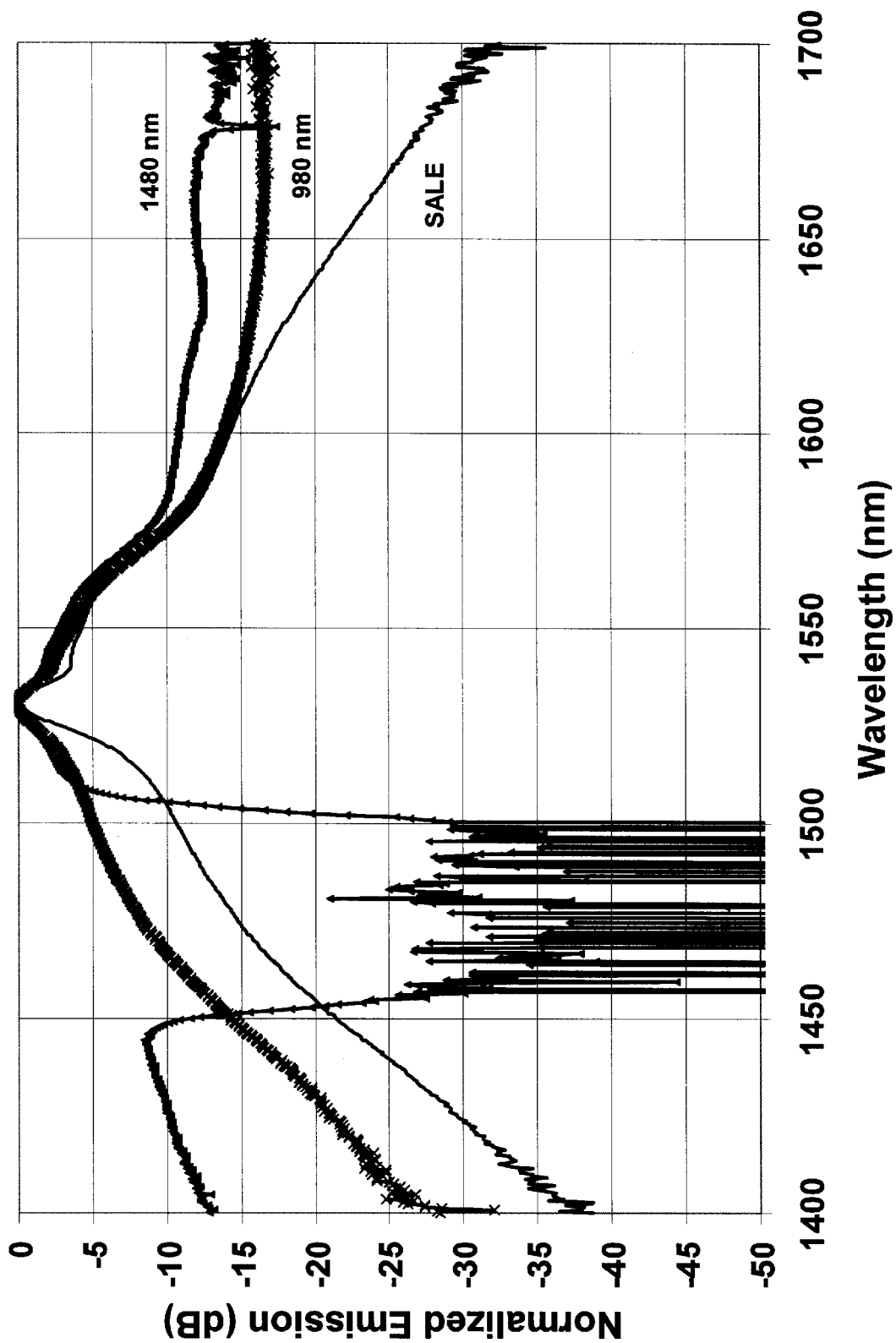
FIG. 7 is a plot of the normalized spontaneous emission for a fiber in accordance with the present invention and for a control fiber.

FIG. 7 is a plot of the spontaneous emission for an erbium-thulium (SALGET) "Fiber 2", described in Example 4 below, and for an erbium-doped C-band (SALE) fiber. The experimental fiber was pumped at 980 and, in a separate experiment, at 1480 nm. Two lengths of fiber were used, 0.5 m and 190 m. FIG. 7 shows normalized spontaneous emission spectra from Fiber 2 and from C-band Er-doped fiber. Fiber 2 exhibits much enhanced normalized emission compared to the standard C-band fiber. For instance, the FWHM (−3 dB) is ~13 nm for C-band fiber pumped at 980 nm, whereas it is ~29 nm for Fiber 2 pumped at 980 nm. For fiber 2 vs. C-band fiber, the difference in absolute spontaneous emission intensity is about −12 dB at 1600 nm, about −10 dB at 1630 nm, about −7 dB at 1650, about −2 dB at 1675 nm and about +4 dB at 1700 nm. Some of this difference may be attributed to the high concentration of absorbing Er and Tm ions in Fiber 2. Owing to the flatness of the emission curve in Fiber 2 in the 1600+ nm region, there is a strong possibility of a diminished gain slope in an amplifier with an Er/Tm codoped fiber. The wavelength of peak emission is slightly blue-shifted in Fiber 2 (1530.9 nm vs 1531.3 nm for C-band) for 980 nm pumping. It is red shifted ~1–2 nm for 1060 nm pumping.

Figure 8:
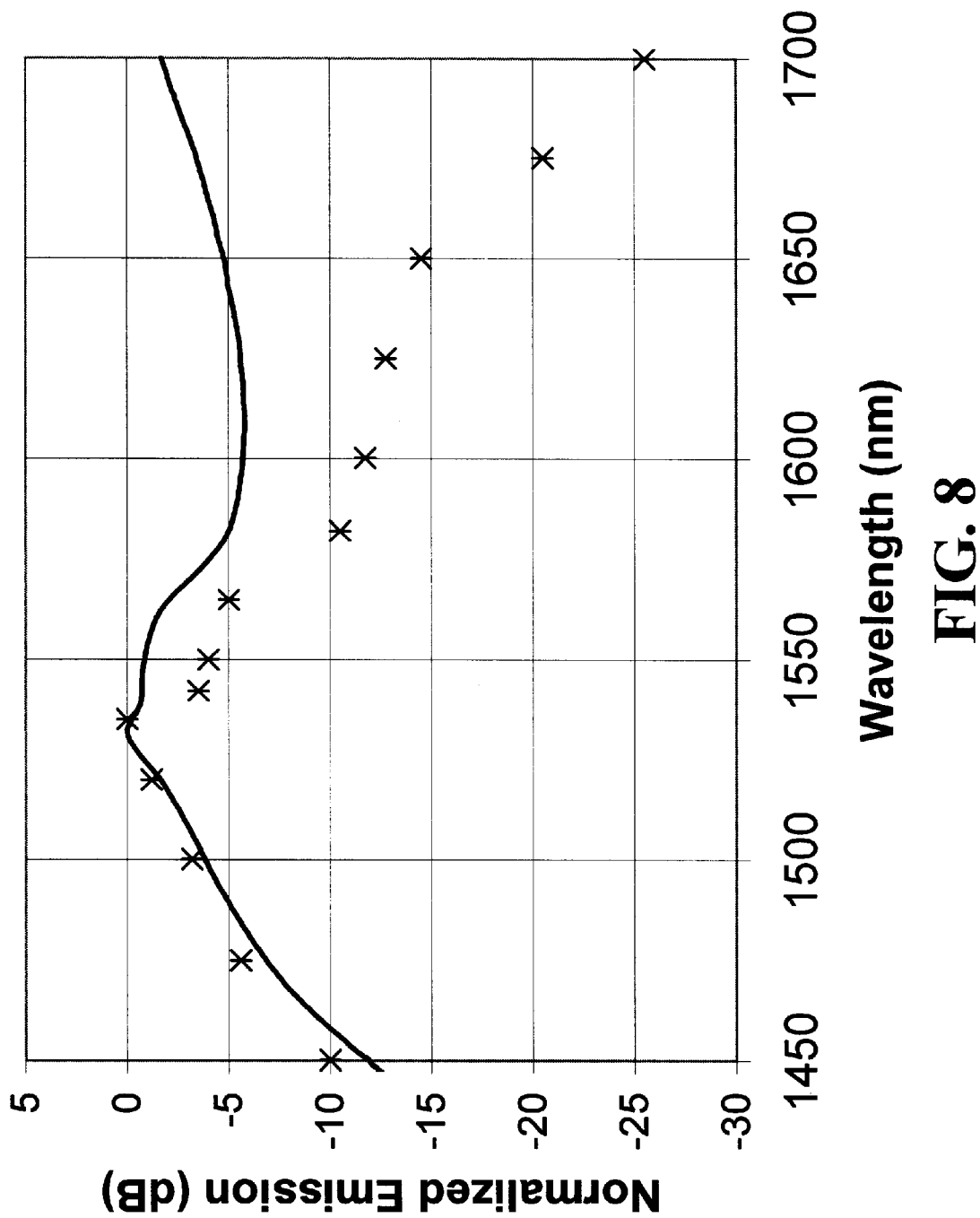
FIG. 8 is a comparative plot of the normalized spontaneous emission for a fiber in accordance with the present invention and for a comparison fiber.

FIG. 8 is a comparative plot of the spontaneous emission lineshapes for erbium-thulium Fiber 1 and for fiber data provided in FIG. 2 of unexamined Korean patent application (KR10-1998-00460125). The fibers were pumped at 980 nm. FIG. 8 shows that Fiber 1 has similar normalized emission in the S-band region and significantly enhanced normalized emission in L-band region as compared to the referenced fiber.

An embodiment of a fiber in accordance with the present invention has an inner cladding that is free of boron and contains Si, O, P, F. Boron increases the sensitivity of Ge toward short-wavelength-induced formation of photodefects. A preform that contains B in the inner cladding results in a fiber with some boron in the core after draw owing to diffusion at high temperature. It is known that Tm-doped silicate fibers can emit short wavelength light owing to upconversion processes. Thus, the boron can make a Ge—Tm-containing fiber more sensitive to photodefects and photodarkening caused by upconverted short wavelength light. The present invention mitigates this effect by providing a boron free fiber.

As illustrated in FIGS. 1–8, fibers, waveguides and glasses in accordance with the present invention have desirable spontaneous emission characteristics. Exemplary fibers, waveguides and glasses according to the present invention have:

- an intensity of spontaneous emission at 1600 nm when pumped at 980 nm of greater than or equal to −8 dB relative to the maximum emission intensity at ~1.53 μm (see, for example FIG. 6).
- an intensity of the spontaneous emission at 1650 nm when pumped at 980 nm greater than or equal to −14 dB relative to the maximum emission intensity at ~1.53 μm (see, for example FIG. 6).
- an intensity of the spontaneous emission at 1500 nm when pumped at 980 nm is no less than −10 dB relative to the maximum emission intensity at ~1.53 μm (see, for example FIGS. 6 and 7).
- an intensity of the spontaneous emission at 1500 nm when pumped at 800 nm is no less than −8 dB relative to the maximum emission intensity at ~1.53 μm
- an intensity of the spontaneous emission at 1500 nm when pumped at 1060 nm is no less than −10 dB relative to the maximum emission intensity at ~1.53 μm (see, for example FIG. 6).

In yet another embodiment, the Er and Tm concentrations vary independently within the core of a fiber or waveguide. This results in different concentrations or Er/Tm ratios at different points or regions within a core. There can be continuous variation in Er and Tm content or multiple discrete regions having different Er and Tm content. By "region" is meant a point for which the volume of material that is sufficiently large to allow the glass composition to be defined or determined. Typically, a region would be greater than about 10,000 nm$^3$. Such designs can provide longer excited state lifetimes and greater amplifier efficiencies. For example, close coupling of Er and Tm ions, which can lead to inter-ion energy exchange and short lifetimes, can be reduced.

In one particular embodiment, waveguides or fibers according to the present invention have radial gradations of Er and Tm concentrations, wherein the respective concentration maxima do not occur at the same radial distances. This may be accomplished by the use of multiple core deposition layers, each with different Er/Tm ratios.

In yet another embodiment, the waveguide or fiber core is segmented into Er-rich and Tm-rich regions, such as by using radial or longitudinal segmentation. This may be accomplished by deposition of alternating annular regions that are relatively rich in Er and relatively rich in Tm respectively.

The above described embodiments are amenable to production by sol-gel, MCVD, or solution-doping approaches, or combinations thereof.

Another optical fiber or waveguide in accordance with the present invention contains fluorine in the core, which can help solubilize rare earth ions such as erbium and thulium and thus reduce pair induced quenching effects.

Optical fibers made with SALGET glasses show the advantages stated above. Amplifiers made with such fibers have better extended L-band operation, tailorable Er—Tm interactions that allow for a variety of pumping schemes, and highly soluble rare earth dopants for good power conversion efficiency.

The present invention may be better understood in light of the following examples.

EXAMPLES

Exemplary Composition 1:

A waveguide glass in accordance with the present exemplary embodiment may be generically described as:

$SAXRE_A RE_{B1} RE_{B2}$, where

S—silica; base glass present in >75 mol %

A—alumina. Without wishing to limit the present invention, Al is believed to act as an index raiser; rare-earth ion solubilizer; generally, increasing concentrations of Al tend to increase the normalized emission, especially from ~1600—1620 nm and tend to decrease the average lifetime.

X—where X acts as an index raiser and network former such as Ge (0–15 mol %). Without wishing to limit the present invention, the present SALGET compositional data shows that for glasses with at least 2% Al, higher concentrations of Ge lead to more desirable emission spectra.

$RE_A$—where $RE_A$ is a non-emissive RE ion, which acts as an index raiser. Without wishing to limit the present invention, it buffers active rare earth ions and can be used to mediate active rare-earth ion interactions. It can help produce materials that have fewer tendencies to form photodefects; which is important with high concentrations of $RE_B$ ions.

$RE_{B1}$—where $RE_{B1}$ is an active RE ion such as Er, which acts as an index raiser.

$RE_{B2}$—where $RE_{B2}$ is an active RE ion, such as Tm, which acts as an index raiser.

Optical Data on Bulk Samples

Photoluminescence data were obtained using a fiber pump/collection scheme. A bead of the composition being tested was suspended on the end of a horizontally oriented optical fiber. An x-y-z translator was used to manipulate the bead within close proximity of the pump fiber, a second fiber oriented horizontally and with its axis perpendicular to the axis of the first fiber. Bead position was optimized for maximum fluorescence emission, which was monitored with an optical spectrum analyzer (OSA). The mounting and initial alignment operations were viewed under an optical microscope. The pump light (typically 980 nm) was coupled to the pump fiber via a wavelength division multiplexer (WDM). The light emitted in the 1450–1700 nm range was collected with the pump fiber and directed to an OSA.

Emission decay curves were collected by pulsing the source light at ~10 Hz and monitoring the decay of the emission intensity. The emission decay curves were fit with a double exponential fit using standard software. From the decay curve analyses, it was possible to determine upper state lifetimes (slow and fast) of the excited state electrons and the relative percentages of each. Three independent fitting parameters were used in the double exponential analysis: (1) radiative decay constant of the slow Er decay: $\tau_{slow}$, (2) radiative decay constant of the fast Er decay: $\tau_{fast}$, and (3) the fraction of the total emission resulting from the fast decay component α.

$$1/\tau_{average} = \alpha * 1/\tau_{fast} + (1-\alpha) * 1/\tau_{slow}$$

Using the McCumber theory, the absorption spectra were predicted from the emission spectra. The absorption spectra were then used to calculate Giles parameters, which are utilized in common models for optical amplifiers.

Example 1

Three Hosts With Four Er/Tm Ratios for Extended L-Band

Erbium-thulium codoped silicate glass beads were prepared with three types of hosts and four Er/Tm levels. To prepare the beads, 2.16 M partially hydrolyzed silica stock solution, 1.0 M aluminum chloride hydrate in methanol, 0.5 M lanthanum nitrate hydrate in methanol, tetraethoxygermane (neat), 0.1 M erbium chloride hydrate in methanol, and 0.1 M thulium nitrate hydrate in methanol were combined in a container. The reagents were mixed so as to give a solution with the ratios shown in Table 1 below.

TABLE 1

| Acronym | Er/Tm | $SiO_2$ | $AlO_{1.5}$ | $LaO_{1.5}$ | $GeO_2$ | $ErO_{1.5}$ | $TmO_{1.5}$ |
|---|---|---|---|---|---|---|---|
| SALET | 10/20 | 92.86 | 6.14 | 0.55 | | 0.15 | 0.30 |
| SALET | 10/2 | 92.96 | 6.04 | 0.82 | | 0.15 | 0.03 |
| SALET | 3/20 | 92.9 | 6.1 | 0.65 | | 0.045 | 0.30 |
| SALET | 3/2 | 93.01 | 5.99 | 0.93 | | 0.045 | 0.03 |
| SAGET | 10/20 | 91.46 | 3.52 | | 4.56 | 0.152 | 0.30 |
| SAGET | 10/2 | 90.46 | 3.52 | | 5.82 | 0.152 | 0.03 |
| SAGET | 3/20 | 91.07 | 3.52 | | 5.05 | 0.0456 | 0.30 |
| SAGET | 3/2 | 90.07 | 3.52 | | 6.33 | 0.0457 | 0.03 |
| SALGET | 10/20 | 91.42 | 3. | 0.55 | 4.58 | 0.15 | 0.30 |
| SALGET | 10/2 | 91.56 | 3 | 0.82 | 4.44 | 0.15 | 0.03 |
| SALGET | 3/20 | 91.48 | 3 | 0.655 | 4.52 | 0.045 | 0.30 |
| SALGET | 3/2 | 91.62 | 3 | 0.925 | 4.38 | 0.045 | 0.03 |

All compositions were batched with a refractive index ~1.4800, which, with a silicate cladding in an optical fiber, would provide numerical aperture (NA)=~0.25. All compositions were added to a mixture of methanol (250 mL) and 29 weight percent aqueous ammonium hydroxide (50 g). The resulting solutions were stirred until they gelled (about 10 seconds). The gels were isolated by suction filtration. The gels were heated at 80° C. overnight to dry the samples. The dried samples were ground with a ceramic mortar and pestle to reduce the aggregate size to less than 150 micrometers. The ground samples were transferred to alumina boats (Coors) and calcined at 950° C. for 1 hour in static air to partially densify and remove organics.

After calcining, the resulting particles were ground in a ceramic mortar with a ceramic pestle and then gravity fed into a hydrogen/oxygen flame. The $H_2/O_2$ ratio in the flame was 5:2. The particles were jetted by the flame onto a water-cooled aluminum incline with a collection trough at the bottom. Glass beads and un-melted particles from each fraction were collected in the trough.

Fluorescence spectra and lifetime data were obtained by the use of the general procedure described above. The analyzed results are shown in FIGS. 1–4.

Example 2

SALGET Designed Experiment

A designed experiment was performed to determine the major compositional factors for eight outputs for SALGET compositions. The experimental matrix is shown in Table 2.

TABLE 2

| Run | [Al] A | [La] B | [Ge] C | [Er] D | [Tm] E |
|---|---|---|---|---|---|
| 1 | + | + | + | − | − |
| 2 | − | + | − | + | + |
| 3 | + | + | − | − | + |
| 4 | 0 | 0 | 0 | 0 | 0 |
| 5 | + | − | + | + | + |
| 6 | 0 | 0 | 0 | 0 | 0 |
| 7 | − | + | + | + | − |
| 8 | + | − | − | + | − |
| 9 | − | − | + | − | + |
| 10 | − | − | − | − | − |

The levels for each of the parameters are in Table 3

TABLE 3

| | | + | − | 0 |
|---|---|---|---|---|
| A | [Al] | 8 | 1 | 4.5 |
| B | [La] | 1.5 | 0.5 | 1 |
| C | [Ge] | 15 | 1 | 8 |
| D | [Er] | 0.15 | 0.045 | 0.0975 |
| E | [Tm] | 0.30 | 0.030 | 0.165 |

Bead samples were prepared as in Example 1. The run order was randomized. The spontaneous emission spectra and fluorescence decay data were collected for a minimum of three beads for each run. Diffuse reflectance spectra were also acquired on the beads. The data were analyzed for the outputs described below, and, using commercial software (such as MINITAB), were analyzed for major effects. The results are shown below in Table 4:

TABLE 4

| Output | Major Factor |
|---|---|
| Er 1.5 μm spontaneous emission peak position | −[Al] |
| Er 1.5 μm spontaneous emission peak breadth | [Al], [La] weak |
| excess emission 1600 nm | [Al] |
| excess emission 1630 nm | [Tm] |
| excess emission 1650 nm | [Tm] |
| excess emission 1700 nm | none |
| erbium upper state lifetime | −[Al], −[Tm] |
| Tm 1.6 μm absorption peak position (1620–1660 nm) | [Al], [Tm] |

A negative coefficient indicates that when the concentration of the ion is increased the output parameter decreases and vice-versa. The data also indicate there are potentially significant interactions of Er—La and Tm—La for every output.

FIG. 5 is a plot of differential normalized emission intensity at 1630 nm vs average lifetime for SALGET samples. The numbers in FIG. 5 refer to the run numbers in Example 2. Data from a SALE glass is included (box) for comparison.

Example 3

SALGET F-Ring Optical Fiber (Fiber 1)

To prepare Fiber 1, a hollow synthetic fused silica tube was cleaned, such as by an acid wash, to remove any foreign matter. The tube was mounted in a lathe for deposition of the inner layers. Several high purity silica-based layers were deposited by chemical vapor deposition (so-called MCVD) by passing a hydrogen/oxygen flame across the tube while flowing $SiCl_4$, $POCl_3$, and $SiF_4$ inside the tube. The innermost layer contained a high concentration of fluorine (e.g. ~4 mol %).

The core of the preform was formed by the solution doping method. A porous silica-germania layer was deposited by MCVD and then infiltrated with a solution that contains Al, La, Er, Tm ions. After deposition of the core, the tube was then dried, consolidated, and collapsed into a seed preform.

Subsequent thermal processing was performed to adjust the core-to-clad ratio to achieve a desired core diameter in the final fiber. Such subsequent processing may involve multiple stretch and overcollapse steps. The completed preform was then hung in a draw tower and drawn into an optical fiber. The draw tower included a furnace to melt the preform, and a number of processing stations, such as for coating, curing and annealing.

By this method a fiber with the approximate composition shown in Table 5 was achieved.

TABLE 5

| Name | $SiO_2$ | $AlO_{1.5}$ | $LaO_{1.5}$ | $GeO_2$ | $ErO_{1.5}$ | $TmO_{1.5}$ |
|---|---|---|---|---|---|---|
| Fiber 1 | 85 | 10.1 | 1.9 | 1.5 | 0.5 | 1.0 |

FIG. 6 shows that there is significant enhancement of the normalized spontaneous emission in the S-band and in the extended L-band regions.

Example 4

SALGET F-Ring Optical Fiber (Fiber 2)

Fiber 2 was prepared in a manner similar to Fiber 1. The composition of fiber 2 is shown in Table 6.

TABLE 6

| Name | $SiO_2$ | $AlO_{1.5}$ | $LaO_{1.5}$ | $GeO_2$ | $ErO_{1.5}$ | $TmO_{1.5}$ |
|---|---|---|---|---|---|---|
| Fiber 2 | 84.95 | 6.0 | 1.2 | 1.8 | 0.03 | 0.15 |

FIG. 7 shows that there is a significant enhancement of the spontaneous emission signal in the S-band region, especially when pumped at 980 nm, and in the extended L-band regions, especially when pumped at 1480 nm.

The waveguides of the present invention offer significant advantages over those previously discussed in the art. Exemplary waveguides in accordance with the present invention, (1) exhibit enhanced extended L-band emission, (2) may contain additional non-active rare earth ions to mediate the Er—Tm interaction and make a more efficient and tailorable amplifier, (3) may contain ions that inhibit photodarkening, and (4) may contain fluorine, which helps solubilize rare earth ions in the matrix.

To achieve desired levels of universally enhanced extended L-band emission in silicate-based fibers, understanding of the effects of Er and Tm concentrations and identification of a suitable host, as described herein, is desirable.

Those skilled in the art will appreciate that the present invention may be used in a variety of optical waveguide and optical component applications. While the present invention has been described with a reference to exemplary preferred embodiments, the invention may be embodied in other specific forms without departing from the spirit of the invention. Accordingly, it should be understood that the embodiments described and illustrated herein are only exemplary and should not be considered as limiting the scope of the present invention. Other variations and modifications may be made in accordance with the spirit and scope of the present invention.

What is claimed is:

1. An optical waveguide, comprising:
   a) a core;
   b) a cladding surrounding the core, the cladding comprising a material having a lower refractive index than the core; and
   c) wherein the core comprises silica, Al, a non-fluorescent rare-earth ion, Ge, Er, and Tm.

2. The optical waveguide of claim 1, wherein the non-fluorescent rare-earth ion is La.

3. The optical waveguide of claim 2, wherein
   a) the concentration of Er is from 15 ppm to 3000 ppm;
   b) the concentration of Al is from 0.5 mol % to 12 mol %;
   c) the concentration of La is less than or equal to 2 mol %;
   d) the concentration of Tm is from 15 ppm to 10,000 ppm; and
   e) the concentration of Ge is less than or equal to 15 mol %.

4. The optical waveguide of claim 3, the core further comprising F.

5. The optical waveguide of claim 4 wherein the concentration of F is less than or equal to 6 anion mol %.

6. The optical waveguide of claim 3, wherein the concentration of Er is from 150 ppm to 1500 ppm.

7. The optical waveguide of claim 3, wherein the concentration of Al is from 4 mol % to 10 mol %.

8. The optical waveguide of claim 3, wherein the concentration of Tm is from 150 ppm to 3000 ppm.

9. The optical waveguide of claim 3, wherein the concentration of Ge is from 1 mol % to 15 mol %.

10. The optical waveguide of claim 1, wherein the waveguide is a laser rod.

11. The optical waveguide of claim 1, wherein the waveguide is an optical fiber.

12. The optical waveguide of claim 1, wherein the waveguide is a planar waveguide.

13. The optical waveguide of claim 1, where the concentration of Al is greater than 1 mol %.

14. The optical waveguide of claim 2, where the concentration of Al plus Ge plus La is greater than 5 mol %.

15. The optical waveguide of claim 2, where the concentration of Al plus Ge plus La is greater than 10 mol %.

16. The optical waveguide of claim 1, where the concentration of Tm is greater than 150 ppm.

17. The optical waveguide of claim 1, where the concentration of Tm is greater than 1000 ppm.

18. The optical waveguide of claim 1, where the concentration ratio of Tm/Er is at least 1.

19. The optical waveguide of claim 1 having an intensity of spontaneous emission at 1600 nm when pumped at 980 nm of greater than or equal to −8 dB relative to the maximum emission intensity at ~1.53 μm.

20. The optical waveguide of claim 1 having an intensity of the spontaneous emission at 1650 nm when pumped at 980 nm greater than or equal to −14 dB relative to the maximum emission intensity at ~1.53 μm.

21. The optical waveguide of claim 1 having an intensity of the spontaneous emission at 1500 nm when pumped at 980 nm is no less than −10 dB relative to the maximum emission intensity at ~1.53 μm.

22. The optical waveguide of claim 1 having an intensity of the spontaneous emission at 1500 nm when pumped at 800 nm is no less than −8 dB relative to the maximum emission intensity at ~1.53 μm.

23. The optical waveguide of claim 1 having an intensity of the spontaneous emission at 1500 nm when pumped at 1060 nm is no less than −10 dB relative to the maximum emission intensity at ~1.53 μm.

24. The optical waveguide of claim 1, wherein the nonfluorescent rare-earth ion is Y.

25. The optical waveguide of claim 1, wherein the nonfluorescent rare-earth ion is Sc.

26. The optical waveguide of claim 1, wherein the nonfluorescent rare-earth ion is Lu.

27. The optical waveguide of claim 1, wherein the average $Er^4I_{13/2}$ lifetime is greater than 1 ms.

28. The optical waveguide of claim 1, wherein the average $Er^4I_{13/2}$ lifetime is greater than 5 ms.

29. An amplifying device comprising the optical waveguide of claim 1.

30. An optical fiber, comprising:
    a) a core, wherein the core comprises a silicate glass core material doped with aluminum, lanthanum, germanium, erbium and thulium dopants;
    b) wherein the concentration of erbium is from 150 ppm to 1500 ppm;
    c) the concentration of aluminum is from 4 mol % to 10 mol %;
    d) the concentration of lanthanum is less than or equal to 2 mol %;
    e) the concentration of thulium is from 150 ppm to 3000 ppm; and
    f) the concentration of germanium is less than or equal to 15 mol %.

31. The optical fiber of claim 30, the core further comprising F, wherein the concentration of F is less than or equal to 6 anion mol %.

32. The optical fiber according to claim 31, wherein the core glass is substantially homogeneous.

33. The optical fiber according to claim 30, said core comprising at least a first and a second region, wherein the first region contains a substantially different Er to Tm ratio than the second region.

34. The optical fiber of claim 33, wherein said regions are in an annular arrangement.

35. The optical fiber of claim 33, wherein the core is made by MCVD.

36. The optical fiber of claim 33, wherein the core is made by sol-gel.

37. The optical fiber of claim 33, wherein the core is made by soot deposition, solution doping, and consolidation.

38. An optical waveguide comprising:
    a) a light-guiding core;
    b) the core comprising silica, aluminum, lanthanum, germanium, erbium, and thulium
    c) wherein the intensity of the spontaneous emission at 1600 nm is no less than −8.8 dB relative to the maximum emission intensity at ~1.53 μm and wherein the intensity of the spontaneous emission at 1650 nm is no less than −14.4 dB relative to the maximum emission intensity at ~1.53 μm.

39. The optical waveguide of claim 38, wherein the average $Er^4I_{13/2}$ lifetime is greater than 1.

40. The optical waveguide of claim 38, wherein the average $Er^4I_{13/2}$ lifetime is greater than 5 ms.

41. The optical waveguide of claim 38, wherein the waveguide is used in an amplifying device.

42. The optical waveguide of claim 38, wherein the waveguide comprises an optical fiber.

43. The optical waveguide of claim 38, wherein the waveguide comprises a planar device.

44. An amplifying device comprising the optical waveguide of claim 38.

45. A waveguide glass comprising silica, aluminum, a nonfluorescent rare-earth ion, germanium, erbium and thulium.

46. The waveguide glass of claim 45, wherein the nonfluorescent rare-earth ion is chosen from the group consisting of La, Y, Lu, and Sc.

47. An optical fiber including the glass of claim 45.

48. An amplifying device comprising the glass of claim 45.

49. An amplifying device comprising an optical fiber including the glass of claim 45.

50. A planar device including the glass of claim 45.

51. An optical waveguide, comprising:
    a) a core;
    b) a cladding surrounding the core, the cladding comprising a material having a lower refractive index than the core; and
    c) wherein the core comprises silica, Al, La, Ge, Er, and Tm.

52. A waveguide glass comprising silica, aluminum, a nonfluorescent rare-earth ion chosen from the group consisting of La, Y, Lu, and Sc, and germanium, erbium and thulium.

* * * * *